(12) United States Patent
Hoferer et al.

(10) Patent No.: US 12,579,326 B2
(45) Date of Patent: Mar. 17, 2026

---

(54) LEVEL SENSOR FOR ACTIVATING AND DEACTIVATING A SAFE OPERATING STATE

(71) Applicant: VEGA Grieshaber KG, Wolfach (DE)

(72) Inventors: Christian Hoferer, Offenburg (DE); Manuel Kaufmann, Berghaupten (DE)

(73) Assignee: VEGA Grieshaber KG, Wolfach (DE)

( * ) Notice: Subject to any disclaimer, the term of this patent is extended or adjusted under 35 U.S.C. 154(b) by 189 days.

(21) Appl. No.: 18/314,573

(22) Filed: May 9, 2023

(65) Prior Publication Data

US 2023/0359776 A1    Nov. 9, 2023

(30) Foreign Application Priority Data

May 9, 2022    (DE) ..................... 10 2022 111 513.5

(51) Int. Cl.
*G06F 21/74*            (2013.01)

(52) U.S. Cl.
CPC ................................... G06F 21/74 (2013.01)

(58) Field of Classification Search
CPC ....................................................... G06F 21/74
See application file for complete search history.

(56) References Cited

U.S. PATENT DOCUMENTS

| | | | | | |
|---|---|---|---|---|---|
| 8,458,463 | B2 * | 6/2013 | Lu | .......................... | G06F 21/445 718/1 |
| 8,880,827 | B2 * | 11/2014 | Weich | ..................... | G06F 21/74 713/193 |

| | | | | | |
|---|---|---|---|---|---|
| 9,343,894 | B2 * | 5/2016 | Gruffaz | ................... | H02H 7/263 |
| 10,082,780 | B2 | 9/2018 | Brockhaus et al. | | |
| 10,140,454 | B1 * | 11/2018 | Spath | ..................... | G06F 21/577 |
| 10,255,157 | B2 * | 4/2019 | Kludy | ..................... | G06F 17/40 |
| 11,024,105 | B1 * | 6/2021 | Brand | ................ | G06K 7/10366 |
| 11,574,206 | B2 * | 2/2023 | Butler, Jr. | ............ | G08B 13/122 |
| 11,720,371 | B2 * | 8/2023 | Inagaki | ................ | H04N 1/4486 713/1 |
| 11,914,715 | B2 * | 2/2024 | Aschauer | .............. | G06F 21/572 |
| 2019/0018750 | A1 * | 1/2019 | Kludy | ................. | G06F 11/3624 |
| 2019/0116105 | A1 * | 4/2019 | Steiner | .................... | H04L 67/12 |
| 2020/0089890 | A1 * | 3/2020 | Aschauer | .............. | G06F 21/572 |
| 2021/0385190 | A1 * | 12/2021 | Jasper | ..................... | G06F 21/31 |
| 2022/0067165 | A1 * | 3/2022 | Huang | ................ | G06F 11/3024 |

(Continued)

FOREIGN PATENT DOCUMENTS

| | | |
|---|---|---|
| DE | 10 2012 109 348 A1 | 4/2014 |
| DE | 10 2013 013 155 A1 | 3/2015 |

(Continued)

OTHER PUBLICATIONS

Germany Search Report issued Dec. 12, 2022, in Germany Patent Application No. 10 2022 111 513.5, (with English Translation of Category of Cited Documents), 8 pages.

*Primary Examiner* — Viral S Lakhia

(74) *Attorney, Agent, or Firm* — Oblon, McClelland, Maier & Neustadt, L.L.P.

(57)            ABSTRACT

A level sensor configured to activate a safe operating state is provided, including an input Interface configured to receive a first activation command to start a first activation method for activating the safe operating state; and a controller connected to the input interface and being configured to perform the first activation method after receiving the first activation command.

10 Claims, 2 Drawing Sheets

(56)        References Cited

U.S. PATENT DOCUMENTS

2023/0142967  A1      5/2023  Rauer et al.
2023/0206371  A1 *   6/2023  Seidlitz ................... G06F 21/10
                                                                            705/320
2023/0412575  A1 *  12/2023  Miyamoto ............ G06F 21/606

FOREIGN PATENT DOCUMENTS

EP          4 177 578  A1      5/2023
EP          4 266 012  A1    10/2023

* cited by examiner

1

LEVEL SENSOR FOR ACTIVATING AND DEACTIVATING A SAFE OPERATING STATE

CROSS-REFERENCE TO RELATED APPLICATIONS

This application claims the benefit of priority under 35 U.S.C. § 119 from German Patent Application No. 10 2022 111 513.5, filed on 9 May 2022, the entire content of which is incorporated herein by reference.

TECHNICAL FIELD

The present disclosure relates to the technical field of measurement technology in industrial or private environments. In particular, the present disclosure relates to a level sensor configured to activate and/or deactivate a safe operating state, a method for activating and/or deactivating such a safe operating state, a program element, and a computer-readable medium.

TECHNICAL BACKGROUND

Measuring devices in industrial or private environments, and especially level sensors, must meet safety requirements under certain circumstances in order to be used at the corresponding measuring point. These safety requirements must be met by both the hardware components of the measuring device and the software components. In this context, one also speaks of SIL operation (SIL: Safety Integrity Level).

The high demands placed on the measuring device by SIL operation can lead in particular to reduced availability and a lower measuring rate.

SUMMARY

There may be a desire to increase the availability and the measuring rate of a SIL-capable measuring device.

This desire is met by the subject-matter of the independent patent claims. Further embodiments result from the subclaims and the following description.

A first aspect of the present disclosure relates to a level sensor configured to activate and/or deactivate a safe operating state or condition.

The safe operating state can in particular relate to the overall system, i.e., the complete level sensor, which has software and hardware and must meet certain normative requirements associated with safe operation. In particular, the level sensor has the corresponding necessary hardware, has undergone commissioning (activation method or procedure), performs diagnostics, protects the parameterization of the level sensor, and operates in safe measurement mode.

In this context, safe software operation can be provided in particular. In this case, safe software is activated in the overall system, which provides commissioning, diagnostics, parameterization protection, and safe measurement operation. This software thus fulfills the normative requirements placed on safe operation. Safe software operation is therefore a prerequisite for safe operation of the level sensor. Only after activating the safe software operation or loading and executing the safe software can the safe operation of the level meter be ensured after a commissioning. In this state, the normative requirements (e.g., SIL) for the hardware and software are fulfilled, so that it is possible to speak of safe operation. This means, for example, that during commissioning, settings have been made to suit the application, diagnostics have been carried out, and finally the settings have been protected against changes.

In contrast, there is also non-safe software operation. In this case, non-secure software can be used in the level sensor, and in particular high-availability software. This is then active in the overall system and ensures high availability and/or a fast measurement rate of the level sensor. It can be provided that it does not enable safe measurement operation and that diagnostics or protection of the parameterization are not active or do not take place.

In particular, the level sensor comprises an input interface which is configured to receive a first activation command for starting a first activation method for activating the safe operating state. Furthermore, a control device is provided that is connected to the input interface and is configured to perform the first activation method after receiving the first activation command from the input interface. In the method described herein, the safe operating state may correspond to safe software operation. I.e., of at least two software parts available in the level meter and separated from each other, the software parts necessary for safe operation are active. This means, for example, that only in safe software operation are methods and interfaces enabled, for example for diagnostics, protection of parameterization, commissioning or even protection of certain software parts, so that after commissioning the device as a whole generates safe measured values in safe operation and makes them available via a safe interface.

Furthermore, also in an embodiment of the present disclosure, the safe operating state is to be understood as the safe operation as a whole. I.e., after activation and running through the disclosed activation process, the level sensor immediately starts safe operation. For example, a commissioning could be omitted depending on the safety level (SIL level), but diagnostic functions are started and the sensor settings are protected against unintentional change.

According to a further embodiment, the control device is also configured to output a fault message on one or even all safety-relevant interfaces of the level sensor until the activation method is completed. This results in the advantage that an evaluation device is made aware of a state of the safe level sensor which deviates from safe operation or safe measurement operation. For example, the operating instructions or normative requirements ensure that, after a malfunction of a sensor operating in safe mode, the evaluation unit can no longer assume that the sensor is operating in safe measuring mode. Manual steps, such as recommissioning or checking the level sensor, e.g., for contamination, must then be carried out. In other words, the fault message initiates safe operation on all interfaces by signaling the need for manual steps (e.g., an initial or renewed startup) to a downstream evaluation device (e.g., industrial process control) or to the plant operator.

During commissioning of the level sensor, steps defined by the manufacturer or a standard are carried out manually by the plant operator or by the level sensor itself, which are essential for safe operation. During commissioning, for example, the installation situation, the medium to be measured, the signal quality of the level sensor's measuring signal, the degree of contamination of the measuring sensor or the antenna and/or environmental data such as the ambient temperature of the level sensor are evaluated and logged. The at least temporary fault message present at the device consequently signals a change in the operating state of the level measuring device.

In particular, it may be possible for the level sensor to switch from safe to non-safe software operation. The corresponding activation method can be initiated by pressing a pushbutton, switch, or button on the level meter or by an operator terminal connected to the level meter, for example in the form of a smartphone, EDD, notebook, or DTM.

According to a further embodiment, the level sensor is configured to activate the non-safe operating state already addressed above, in which case the input interface is arranged to receive a second activation command for starting a second activation method for activating the non-safe operating state. In this case, the control device is arranged to perform the second activation method after the input interface has received the second activation command.

This may make it possible, in particular, to switch from non-safe to safe operation under input interface control, and vice versa.

According to a further embodiment, a first control program is active in safe software operation, which provides commissioning, diagnostics, sensor parameterization protection, and/or safe measurement operation such that the level sensor meets SIL requirements.

In contrast, it can be provided that a second control program is active in the non-safe operating state, which provides a higher availability and/or faster measuring rate.

According to a further embodiment, the activation method comprises a persistent storage that a safe operating state is to be achieved. The activation method can include a sensor restart and/or a reset of the customer's parameterization and/or the loading of additional program code for the safe operating state and/or the loading of additional program code for safe commissioning and/or the prevention of the execution of program code that exists exclusively for the non-safe operating state and/or the activation of additional hardware functions and/or the protection of the parameterization against changes.

It can be considered a core aspect of the present disclosure that the method can be used to enable or disable safe software operation. By actuating a switch via an operator terminal or a switch directly on the level meter, process steps are executed which enable or disable the safe operating state. The combination of two software procedures for safe and non-safe operation in a single measuring device is particularly advantageous. Only through this method can safe selection be made between the two activation and level sensor operating procedures.

Another aspect of the present disclosure relates to a method for activating a safe operating state of a measuring device and, in particular, a level measuring device, wherein a first activation command is first issued to start a first activation method for activating the safe operating state of the measuring device. Thereupon, the first activation method is performed after receiving the first activation command.

Another aspect relates to a program element that, when executed on a control unit of a measuring device, causes the measuring device to perform the steps described above and below.

Another aspect relates to a computer-readable medium on which the program element described above is stored.

Further embodiments of the present disclosure are described below. In the following description of figures, the same reference signs are used for the same or similar elements. The representations in the figures are schematic and not to scale.

DETAILED DESCRIPTION OF EMBODIMENTS

Figure 1:
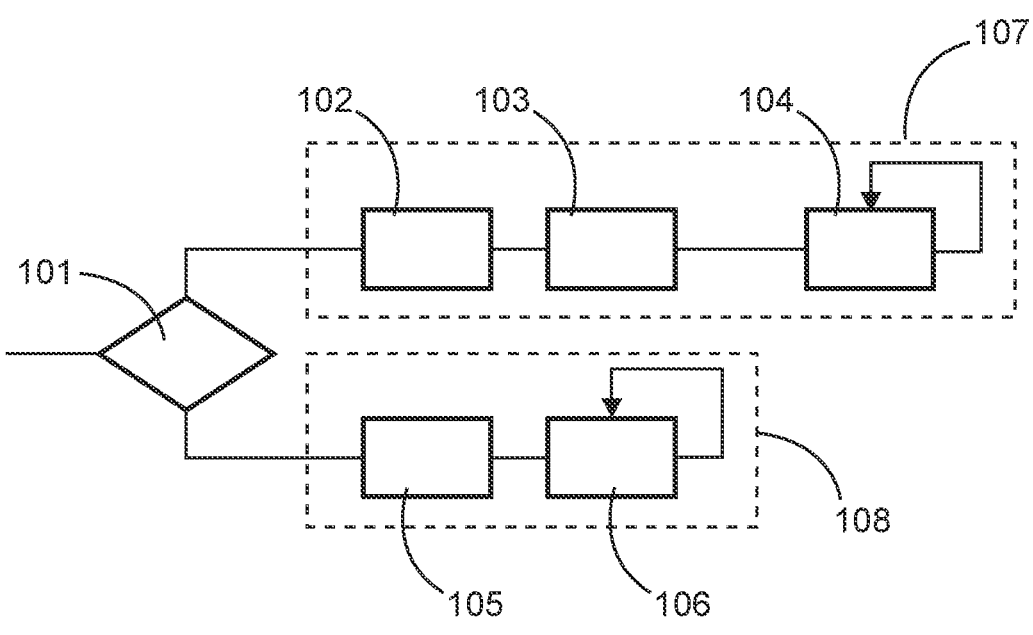
FIG. 1 shows the activation of a safe operating state and a non-safe operating state according to an embodiment.

FIG. 1 illustrates the activation of safe and non-safe operating states. The present disclosure enables configuration of a measuring device, and in particular a level meter, that is designed for both safe and non-safe operation. Safe operation means that the meter meets normative hardware and software requirements to ensure that either a correct reading is output or the meter reports a fault.

The method can be used in particular for level measuring instruments whose hardware normatively fulfills the criteria of safe operation, but whose software is designed for both unsafe and safe operation. The method now shows ways in which the software can be transferred from non-safe operation (or non-safe software operation) to safe operation (or safe software operation) and vice versa.

An advantage for the division into safe and non-safe software and their respective operation is the availability of the measured values and/or the measuring rate. During safe software operation, the software is designed to immediately issue a fault if operating parameters move outside strict limits. In addition, during safe software operation, the processor itself is monitored. Both volatile and non-volatile memory areas are cyclically checked by writing and reading them back. Even the arithmetic unit is stimulated with predefined arithmetic tasks and the result is compared, for example, with the expected result in the non-volatile memory to ensure safe software operation. The arithmetic unit (control unit) can also be designed with redundancy.

The following components/functions can be active in safe software operation:

CPU test: Cyclic check of the arithmetic unit.

RAM/ROM test: Checking the volatile and non-volatile memory.

Soft error detection: Measures and monitors soft errors, e.g., random tilting of a single bit.

MPU (Memory Protection Unit): protection of access to memory areas between secure and non-secure software.

Program sequence control: monitoring the order of the software sequence.

Redundant arithmetic unit/ROM/Flash.

Monitoring of the measurement signal according to quality criteria.

Monitoring of operating parameters, especially temperature, air pressure, humidity.

FIG. 1 schematically shows the two-part software for safe and non-safe operation. A switch/button/button for selecting safe and non-safe software operation 101 is used to determine whether safe or non-safe operation is requested, and thus whether the safe or non-safe software is to be activated. If the safe operation has been selected, steps from the transition to the safe software operation are initiated, i.e., started for the activation of the safe software, in accordance with the present disclosure in the function block 102. In FIG. 1, this function block is within the system boundary of the safe software 107, since the activation process must also satisfy safety-critical requirements.

Subsequently, the commissioning for safe operation takes place in function block 103. The commissioning steps can include, for example, checking the installation situation, checking the measuring signal, checking the operating temperature, starting up measured values or setting, reading back, and protecting against changes to configuration values.

After that, the measuring device operates in safe measuring mode 104 and cyclically determines the level (or another measured variable) and/or carries out diagnostics.

The situation is different if the non-secure but highly available software is to be started. Activation is performed here via step 105. Safe startup is not mandatory and can be omitted here. The measuring device then operates in the non-secure measuring mode 106, in which highly available measured values are determined. Highly available means, for example, that the level meter is instructed to determine a measured value under extreme states (e.g., very noisy measurement signal, low supply voltage, high ambient temperatures) and then also outputs this value.

In general, such a system of two-part or multi-part software can be realized by fixed system boundaries. For example, reference character 107 shows the system boundary of secure software, and reference character 108 shows the system boundary of insecure/high-availability software. On the one hand, the software can be located in two different memory blocks. Also an implementation in a single internal or external (related to the microcontroller) memory device is possible, if it is supervised that both program and/or data memories are strictly separated from each other. This can be achieved, for example, with an MPU (Memory Protection Unit).

Figure 2:
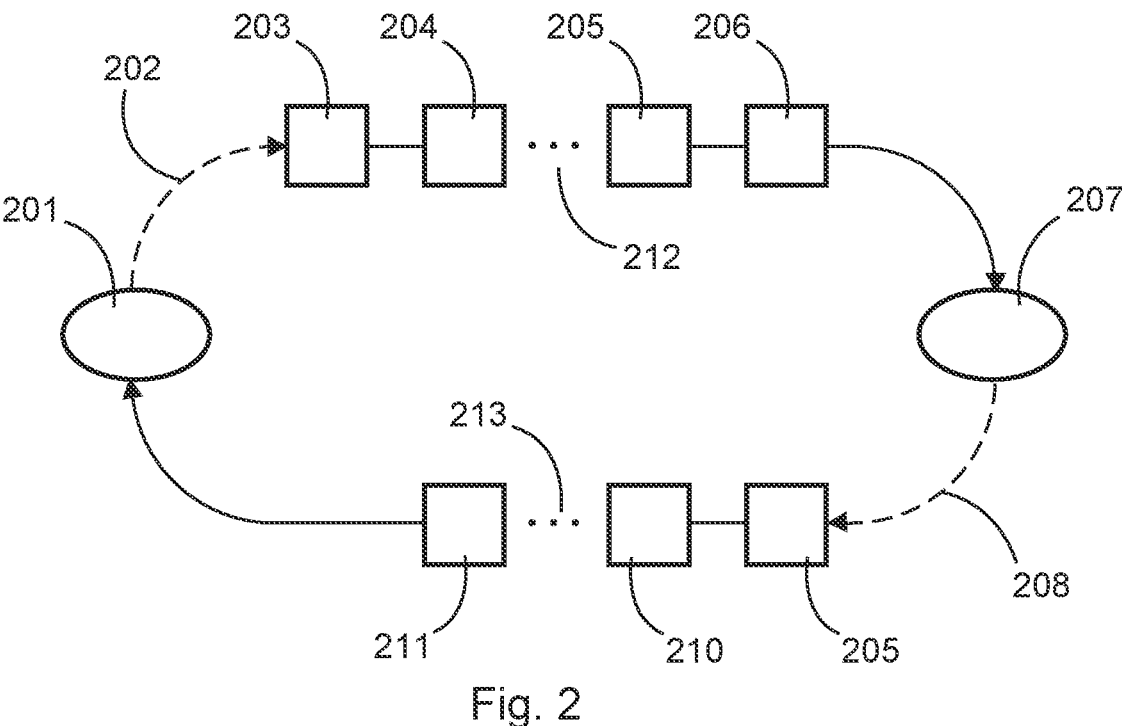
FIG. 2 shows an example of switching between a safe and a non-safe operating state.

FIG. 2 shows an overview for switching between safe and non-safe operation. In this example, the measuring device operates with the non-safe software in non-safe software mode (state 201). An event 202 instructs the software to switch to safe software operation. Such an event can be triggered by a button event, via an external operator terminal (PC/mobile phone) or a service and commissioning module. FIG. 2 explicitly shows four substeps 203, 204, 205, 206 that are required for a safe switch in this example. FIG. 2 also shows the option to add or remove steps, which is indicated by the placeholder ( . . . ) 212.

Specifically, the sequence may first include a step 203 that transfers all safety-relevant interfaces (e.g., current output) to a fault message. As the next step 204, software functions can additionally or alternatively be activated to enable commissioning. In a third step 205, previously inactivated hardware circuits are activated. Subsequently, the fault message of the safety-relevant interfaces is reset in step 206 and safe software operation is activated. Only now can the safe operation of the overall system be commissioned.

During safe operation 207, the functions activated by the methods presented ensure that the measuring device outputs a correct measured value or that the safety-related interface goes into fault.

Examples required to enable safe software operation (substeps 203, 204, 205, 206, or 212) are as follows:

The interface for outputting the level (e.g., a 4 . . . 20 mA interface) is transferred to a fault;

A persistent storage that a safe software operating state is to be reached. For example, information is stored that the input interface has received an activation command, e.g., the pushbutton has been pressed;

The level meter is restarted;

All parameters previously set in the sensor (by a technician/customer/user) are reset to factory defaults;

Loading additional program code for safe software operation (for example, software monitoring functions);

Loading additional program code for safe commissioning;

Make functionality accessible to the customer, e.g., by reloading (safe commissioning), or/and accessible (e.g., put assignment temperature on current output);

Preventing the execution of program code that exists solely for non-safe software operation (ensured by a program flow control and/or memory protection unit);

Activation of additional hardware functions, for example by activating inactive hardware circuits (monitoring of components/monitoring of voltage values/monitoring of temperature/redundant hardware, such as a second CPU);

Loading of other parameter settings for safe measuring operation, especially concerning the measuring function for evaluation of the measuring signal and extraction of the measured value, different settings are used;

Protection of the parameterization against changes;

Instructing the operator interface of an operator terminal to indicate operation as unsafe until the steps are completed, e.g., by specifying a time until the steps are safely completed or transmitting a capital value.

This is contrasted with the activation of the non-safe, i.e., highly available, software operation. Here, too, the triggering, starting from state 207, is by an event that initiates the deactivation process of the safe software operation and the activation of the non-safe software operation (see step 208). Here, the steps from the activation process of the safe software operation are mirrored. However, functions that are disruptive to high availability operation are deactivated or other parameter data sets are loaded for high availability measurement operation.

This can be more, less, or the same number of steps as when activating safe software operation.

Figures 3, 4, 5:
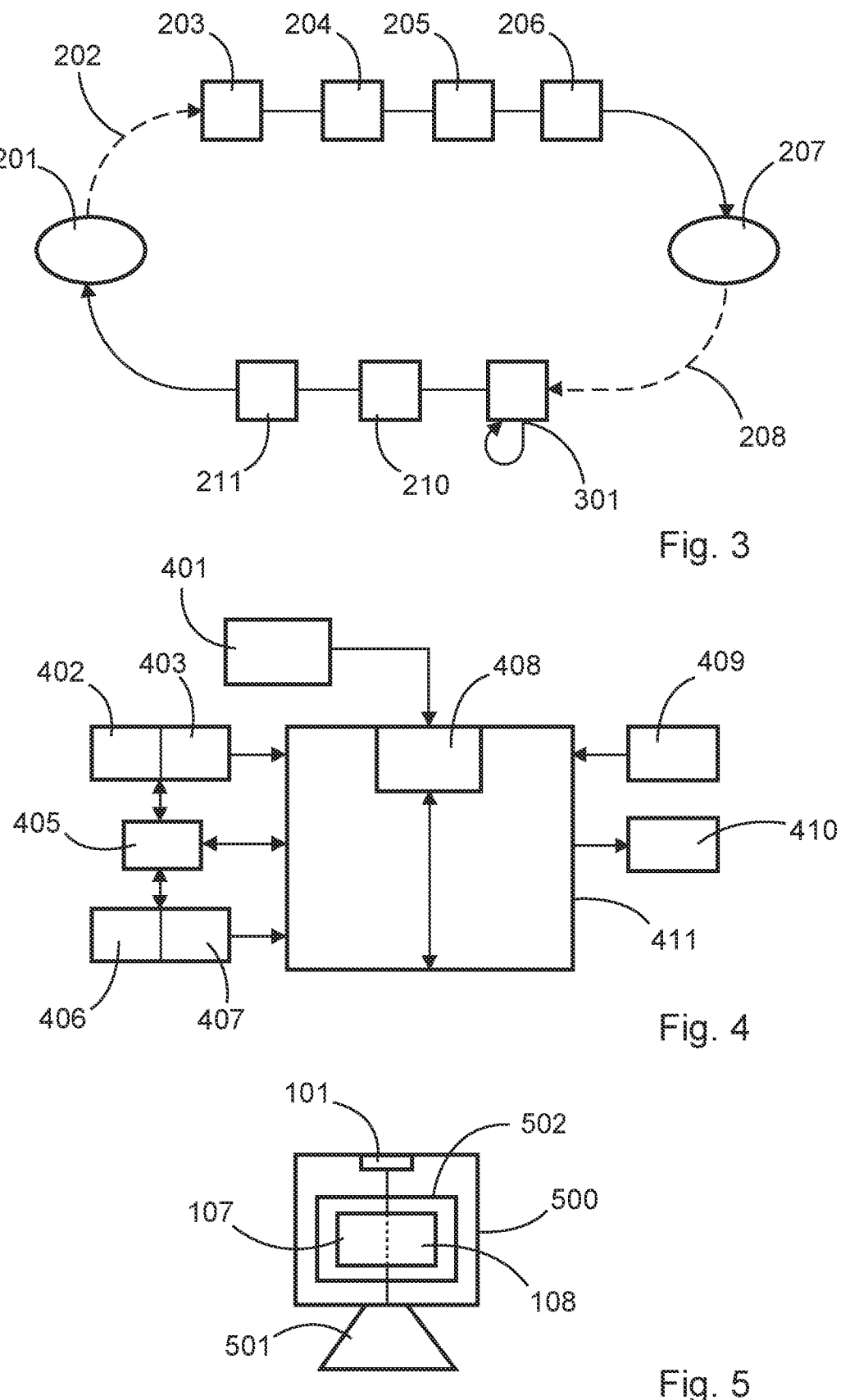
FIG. 3 shows a modification of FIG. 2.
FIG. 4 shows a block diagram for separating secure and non-secure software components.
FIG. 5 shows a measuring device according to an embodiment.

FIG. 3 shows a variation of the method shown in FIG. 2. Unlike FIG. 2, the event for switching to non-safe software operation can not only be triggered by pressing a button, but can also be internally time- or event-controlled. For example, the guarantee of safe operation of the overall system (consisting of hardware and software) expires after several years due to aging of the components. With this method, the measuring device does not have to be disposed of, but can be used elsewhere in a highly available, but no longer safe operation. Thus, it is possible that a timed event (e.g., after ten years) or an overtemperature (the components can no longer be considered safe) triggers transition 208.

An additional step 301 first issues a fault, notes that safe software operation cannot be reactivated, and waits for a manual input that a final activation of non-safe operation should occur. This means that a step in the activation provides to note secured that a reactivation of the safe software operation is excluded.

FIG. 4 shows an implementation example in the form of a block diagram depicting the separation between secure and non-secure software areas. In particular, FIG. 4 shows a rough block diagram of a processor or microcontroller with separate program and data memory 402, 403 and 406, 407. The memory areas are for secure and non-secure software respectively (406: Data memory safe software, 407: Data memory non-safe software). 402 shows the program memory of the safe software and 403 shows the program memory of the non-safe software. 401 is the clock for the CPU 408. 405 is the unit for monitoring the memory limit of the program memory and data memory. 409 are the input signals to the processors 408 and 410 are the output signals from the processor 408. All of the above devices are interconnected by a data and signal bus 411.

The memory areas each serve the secure and non-secure software. The memory areas can be distributed within a single memory (also granular) as indicated in FIG. 4 or implemented by two separate memory modules. A memory boundary monitoring unit 405 (MPU-Memory Protection Unit) is used to monitor that direct access across the memory boundary cannot occur during secure software operation. The unit for monitoring the memory boundary is started in a substep (e.g., in accordance with step 204 or 205) when safe software operation is activated.

Alternatively, a third memory area is possible, which is protected separately and contains only the method for activating secure and non-secure software operation.

FIG. 5 shows a measuring device according to one embodiment, which is for example a level sensor 500. At the top of the level sensor is the input interface 101, which is connected to the control device 502 and thus to the processor and the two areas 107 for the secure software and 108 for the insecure and highly available software. At the bottom of the device is an antenna 501 for radiating the measurement signal towards the product surface.

The terms used in the claims should be construed to receive the broadest reasonable interpretation consistent with the foregoing description. For example, the use of the article "a" or "the" in introducing an element should not be construed to exclude a plurality of elements. Similarly, the mention of "or" should be construed to include a plurality of elements, so that the mention of "A or B" does not exclude "A and B" unless it is clear from the context or the preceding description that only one of A and B is meant. Further, the phrase "at least one of A, B, and C" should be understood to mean one or more of a group of elements consisting of A, B, and C, and should not be interpreted to require at least one of each of A, B, and C listed, whether A, B, and C are related as categories or otherwise. In addition, the reference to "A, B, and/or C" or "at least one of A, B, or C" should be construed to include any single unit of the listed elements, e.g., A, any subset of the listed elements, e.g., A and B, or the entire list of elements A, B, and C.

The invention claimed is:

1. A level sensor configured to activate and/or deactivate a safe operating state, comprising:

an input interface configured to receive a first activation command to start a first activation method to activate the safe operating state; and a control device connected to the input interface, configured to perform the first activation method after receiving the first activation command, wherein the first activation method further comprises a sensor restart, wherein the first activation method further comprises loading additional program code for the safe operating state, and wherein the first activation method further comprises preventing execution of program code exclusive to the non-safe operating state.

2. The level sensor according to claim 1, wherein the control device is further configured to output a fault message on one safety-relevant interface of the level sensor until the first activation method is completed.

3. The level sensor according to claim 1, wherein the control device is further configured to output a fault message on all safety-relevant interfaces of the level sensor until the first activation method is completed.

4. The level sensor according to claim 1, further configured to activate a non-safe operating state, wherein the input interface is further configured to receive a second activation command for starting a second activation method for activating the non-safe operating state, and wherein the control device is arranged to perform the second activation method after receiving the second activation command.

5. The level sensor according to claim 1, wherein, in the safe operating state, a first control program is active which provides commissioning, diagnostics, parameterization protection of the level sensor, and/or safe measurement operation such that the level sensor meets safety integration level (SIL) requirements.

6. The level sensor according to claim 1, wherein a second control program is active in the non-safe operating state, providing higher availability and/or faster measurement rate.

7. The level sensor according to claim 1, wherein the input interface comprises a button or switch on the level sensor and/or an operator terminal connected to the level sensor.

8. The level sensor according to claim 1, wherein the first activation method comprises a persistent storage of information that a safe operating state is to be achieved, wherein the first activation method further comprises a reset of customer-side parameterization, wherein the first activation method further comprises loading additional program code for safe commissioning, wherein the first activation method further comprises activating additional hardware functions, and/or where the first activation method includes protection of the parameterization against changes.

9. A method for activating and/or deactivating a safe operating state of a measuring device, comprising the steps of:

receiving a first activation command to start a first activation method to activate the safe operating state; and performing the first activation method after receiving the first activation command.

10. A nontransitory computer-readable storage medium comprising computer program instructions stored therein, which, when executed on a control unit of a measuring device, causes the measuring device to perform the following steps of:

receiving a first activation command to start a first activation method to activate a safe operating state; and performing the first activation method after receiving the first activation command.

* * * * *